United States Patent
Giambiagi et al.

(10) Patent No.: US 9,509,722 B2
(45) Date of Patent: *Nov. 29, 2016

(54) PROVISIONING ACCESS CONTROL USING SDDL ON THE BASIS OF AN XACML POLICY

(71) Applicant: AXIOMATICS AB, Stockholm (SE)

(72) Inventors: Pablo Giambiagi, Stockholm (SE); Erik Rissanen, Stockholm (SE); Travis Spencer, Stockholm (SE)

(73) Assignee: AXIOMATICS AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/623,311

(22) Filed: Feb. 16, 2015

(65) Prior Publication Data

US 2015/0163250 A1     Jun. 11, 2015

Related U.S. Application Data

(63) Continuation of application No. 13/777,789, filed on Feb. 26, 2013, now Pat. No. 8,966,576.

(60) Provisional application No. 61/603,667, filed on Feb. 27, 2012.

(51) Int. Cl.
*H04L 29/06* (2006.01)
*G06F 21/00* (2013.01)
*G06F 21/62* (2013.01)

(52) U.S. Cl.
CPC .............. *H04L 63/20* (2013.01); *G06F 21/00* (2013.01); *G06F 21/6218* (2013.01); *H04L 63/10* (2013.01)

(58) Field of Classification Search
CPC .............. G06F 21/00; G06F 212/604; G06F 21/6218; G06F 21/6227; G06F 17/30421; G06F 2221/2141; H04L 63/20; H04L 63/10
USPC ......... 726/1–4, 11–14, 26–27; 707/759, 769; 709/225, 226, 229
See application file for complete search history.

(56) References Cited

U.S. PATENT DOCUMENTS 6,880,005 B1   4/2005   Bell et al.
7,437,362 B1   10/2008  Ben-Natan
(Continued)

FOREIGN PATENT DOCUMENTS

EP         1879120        1/2008
WO    WO 2006/118659    11/2006
(Continued)

OTHER PUBLICATIONS

Ludwig Seitz et al, Policy Administration Control and Delegation using XACML and Delegent, pp. 49-54, IEEE, 2005.*
(Continued)

*Primary Examiner* — Shanto M Abedin
(74) *Attorney, Agent, or Firm* — Barnes & Thornburg LLP

(57) ABSTRACT

A method is disclosed, and a corresponding data carrier and policy converter, for producing at least one Security Descriptor Definition Language, SDDL, rule from an eXtensible Access Control Markup Language, XACML, policy (P), wherein said at least one SDDL rule is enforceable for controlling access to one or more resources in a computer network. A reverse query is produced indicating a given decision (d), which is one of permit access and deny access, and a set (R) of admissible access requests. Based on the reverse query, the XACML policy (P) and the given decision (d) are translated into a satisfiable logic proposition in Boolean variables ($v_i$, i=1, 2, . . . ) From said ROBDD, variable assignments ($RC_j$=[$ARC_{j1}$: $v_1$=$x_{j1}$, $ARC_{j2}$: $v_2$=$x_{j2}$, . . . ], j=1, 2, . . . ) satisfying the logic proposition are derived and at least one SDDL rule is created based on said variable assignments ($RC_j$=[$ARC_{j1}$: $v_1$=$x_{j1}$, $ARC_{j2}$: $v_2$=$x_{j2}$, . . . ], j=1, 2, . . . ) satisfying the logic proposition.

10 Claims, 3 Drawing Sheets

(56) References Cited

U.S. PATENT DOCUMENTS

| | | |
|---|---|---|
| 7,747,647 B2 | 6/2010 | Canning et al. |
| 7,921,452 B2 | 4/2011 | Ridlon et al. |
| 7,941,336 B1 | 5/2011 | Robin-Jan |
| 8,010,991 B2 | 8/2011 | Sarukkai et al. |
| 8,024,771 B2 | 9/2011 | Malkin et al. |
| 8,122,484 B2* | 2/2012 | Karjoth ............ G06F 17/30507 709/225 |
| 8,601,535 B2 | 12/2013 | Goh et al. |
| 8,601,549 B2 | 12/2013 | Dickerson |
| 2006/0230282 A1* | 10/2006 | Hausler ............... G06F 21/6218 713/182 |
| 2006/0253410 A1 | 11/2006 | Nayak et al. |
| 2007/0056018 A1* | 3/2007 | Ridlon ................. H04L 63/102 726/1 |
| 2007/0056019 A1* | 3/2007 | Allen ..................... G06Q 10/06 726/1 |
| 2007/0078840 A1 | 4/2007 | Stern et al. |
| 2007/0078874 A1 | 4/2007 | Stern et al. |
| 2007/0283443 A1 | 12/2007 | McPherson et al. |
| 2008/0016033 A1 | 1/2008 | Forstmann et al. |
| 2008/0066160 A1* | 3/2008 | Becker .................... G06F 21/62 726/4 |
| 2009/0178107 A1 | 7/2009 | Karjoth et al. |
| 2009/0205018 A1 | 8/2009 | Ferraiolo et al. |
| 2009/0265780 A1 | 10/2009 | Korkus et al. |
| 2010/0042973 A1 | 2/2010 | Anderson et al. |
| 2010/0153695 A1 | 6/2010 | Bussard et al. |
| 2010/0257579 A1* | 10/2010 | Karjoth ............... G06F 21/6227 726/1 |
| 2010/0325692 A1 | 12/2010 | Rissanen |
| 2010/0332601 A1 | 12/2010 | Walter et al. |
| 2011/0126281 A1* | 5/2011 | Ben-Zvi ............. G06F 21/6218 726/21 |
| 2011/0161947 A1* | 6/2011 | Ashok ....................... G06F 8/65 717/168 |
| 2011/0246498 A1* | 10/2011 | Forster .................... G06F 21/10 707/769 |
| 2011/0276604 A1 | 11/2011 | Hom et al. |
| 2011/0313981 A1* | 12/2011 | Ben-Natan .......... G06F 21/6227 707/694 |
| 2011/0321136 A1* | 12/2011 | Milman ............... G06F 21/6218 726/4 |
| 2012/0017260 A1 | 1/2012 | Narain et al. |
| 2012/0158797 A1* | 6/2012 | Hermanns ......... G06F 17/30421 707/810 |
| 2012/0296930 A1 | 11/2012 | Lewak et al. |
| 2013/0055344 A1 | 2/2013 | Rissanen et al. |
| 2013/0144901 A1* | 6/2013 | Ho .................... G06F 17/30498 707/769 |
| 2014/0052749 A1* | 2/2014 | Rissanen ............. G06F 21/6227 707/759 |

FOREIGN PATENT DOCUMENTS

| | | |
|---|---|---|
| WO | WO 2010/128926 | 11/2010 |
| WO | WO 2010/151493 | 12/2010 |

OTHER PUBLICATIONS

Axiomatics Brings XACML-based Attribute-based Access Control to Windows Server, pp. 1-3, PRWeb, Feb. 23, 2012.

Binnig, "Reverse Query Processing," downloaded from the Internet at: http://archive.systems.ethz.ch/www.dbis.ethz.ch/research/publications/rqp.pdf (Apr. 20, 2007).

Hughes et al., "Automated verification of access control policies using a SAT solver," *Int. J. Softw. Tools Tech. Trans.*, 10(6):503-520 (Oct. 2008).

Sandberg, "Administrative Queries in XACML—feasibility of partial-query evaluation," *KTH Computer Science and Communications, Swedish Institute of Computer Science*, pp. 1-125 (Dec. 2006).

* cited by examiner

"PRIOR ART"

PROVISIONING ACCESS CONTROL USING SDDL ON THE BASIS OF AN XACML POLICY

CROSS REFERENCE TO RELATED APPLICATIONS

This application is a Continuation of copending application Ser. No. 13/777,789, filed Feb. 26, 2013, which claims the benefit of priority under 35 U.S.C. §119(e) to U.S. Provisional Patent Application No. 61/603,667, filed Feb. 27, 2012. The disclosures set forth in the referenced applications are incorporated herein by reference in their entireties.

FIELD OF THE INVENTION

The invention disclosed herein generally relates to the field of access control (AC) in computer systems. In particular, it provides devices and methods for provisioning access control using Security Descriptor Definition Language (SDDL) on the basis of an attribute-based access control (ABAC) policy according to the eXtensible Access Control Markup Language (XACML).

BACKGROUND OF THE INVENTION

An ABAC policy defines access control permissions based on the attributes of the subject, of the resource, and of the action that the subject wants to perform on the resource (e.g., read, write). A resource may be, inter alia, a portion of a personal storage quota, a business unit storage quota, an information retrieval system, a (portion of a) database, an online service, a protected webpage or a physical device.

There currently exist general-purpose AC languages that have the richness to express fine-grained conditions and conditions which depend on external data. One particular example of an AC language is the eXtensible Access Control Markup Language (XACML) which is the subject of standardization work in a Technical Committee of the Organization for the Advancement of Structured Information Standards (see http://www.oasis-open.org). A policy encoded with XACML consists of functional expressions in attribute values, and the return value (decision) of the policy is one of Permit, Deny, Not Applicable, or Indeterminate. An XACML policy can apply to many different situations, that is, different subjects, resources, actions and environments and may give different results for them. The XACML specification defines how such a request is evaluated against the policy, particularly what policy attributes are to be evaluated or, at least, which values are required to exist for a successful evaluation to result. Key characteristics of this evaluation process are that the request (the query against the policy) must describe the attempted access to a protected resource fully. In practice, it may be that the request is constructed in multiple stages by different components, so that a PEP (Policy Enforcement Point) provides only some initial attribute values and a PDP (Policy Decision Point) or other components can dynamically fetch more values from remote sources as they are needed.

XACML-based solutions typically introduce "authorization as a service" whereby a Policy Enforcement Point (PEP) within a target application/system captures access requests in real time and sends them to a Policy Decision Point (PDP) for evaluation against one or more XACML policies. In practice, however, many organizations operate systems for which there are currently no PEP components available, and whose authorization mechanisms are built around other models than XACML.

One example of such non-XACML models, is Security Descriptor Definition Language, SDDL, of Microsoft Corp. of Redmond, Wash., which provides a syntax for defining access conditions in a string format. The syntax is e.g. used in Active Directory (AD) which is a directory service for Windows domain networks available from Microsoft Corp. of Redmond, Wash.

SUMMARY OF THE INVENTION

It is an object of the present invention to provide methods and devices, improved from the point of view of computational complexity, for provisioning user permissions equivalent to an ABAC policy in a form suitable for access-control systems oriented towards a different authorization model. It is a particular object to provide such methods and devices for provisioning user permissions represented in SDDL based on an XACML policy.

As used in this disclosure,
 subjects and resources are categories; optional further categories are actions and environments; each element belongs to exactly one category; and
 an attribute is a characteristic of an element which may be referenced in expressions, particularly predicates, conditions and rules, within a policy.

In an example situation, the users of a computer system may be said to correspond to elements in the category of subjects. Similarly the objects (e.g., files, folders etc. in a file system or physical or virtual resources) may correspond to elements in the category of resources.

The inventors have realized that an existing XACML policy can be utilized in order to reduce the number of numerical operations that are necessary for provisioning a set of equivalent access control rules in a system providing access control using SDDL.

SDDL uses so called claims based access control. As such the generation and management of rules for access control involves a lot of manual work and lacks structured and/or automated procedures. Furthermore, claims based access control also do not scale in any structured way such that previous generation and management is automatically applied to an extended set of rules.

XACML policies use so called Attribute Based Access Control and unlike SDDL include structured procedures for generation and management of policies. Furthermore, XACML does scale in an structured way such that previous generation and management is automatically applied.

However, as XACML and SDDL use different types of access control, an XACML policy is not readily applicable in a system using SDDL based access control. Nor is there any readily apparent one-to-one translation of an XACML policy into corresponding SDDL rules. SDDL differs from XACML in that XACML has an hierarchical structure of a different type than SDDL. SDDL does not include algorithms for combination, deny-decisions and some further functions.

The inventors have realized that a particular translation of the XACML policy produces an intermediary form of the policy that can be translated into at least one corresponding SDDL rule.

These insights form the basis for the methods and devices defined in the independent claims. The dependent claims define advantageous embodiments.

In a first aspect, the invention provides a computer-implemented method for producing Security Descriptor Definition Language, SDDL, rules from an eXtensible Access Control Markup Language, XACML, policy (P), wherein said SDDL rules are for enforcing control access to one or more resources in a computer network, said method comprising the steps of:

producing a reverse query indicating a given decision (d), which is one of permit access and deny access, and a set (R) of admissible access requests;

translating, based on the reverse query, the XACML policy (P) and the given decision (d) into a satisfiable logic proposition in Boolean variables ($v_i$, i=1, 2, ...);

deriving variable assignments ($RC_j$=[$ARC_{j1}$: $v_1$=$x_{j1}$, $ARC_{j2}$: $v_2$=$x_{j2}$, ...], j=1, 2, ...) satisfying the logic proposition; and creating at least one SDDL rule based on said variable assignments ($RC_j$=[$ARC_{j1}$: $v_1$=$x_{j1}$, $ARC_{j2}$: $v_2$=$x_{j2}$, ...], j=1, 2, ...) satisfying the logic proposition. The variable assignments ($RC_j$=[$ARC_{j1}$: $v_1$=$x_{j1}$, $ARC_{j2}$: $v_2$=$x_{j2}$, ...], j=1, 2, ...) together constitute an intermediary form of at least a subset of the XACML policy. If all variable assignments are identified satisfying the logic proposition a complete intermediary form of the XACML policy is produced. From this intermediary form all requests resulting in the given decision can be identified. Furthermore, the intermediary form is such that it provides for translation into SDDL. More specifically, the variables of the intermediary form carries information useful for producing SDDL rules.

A further advantage with the invention is that already existing XACML rules can be translated and applied, e.g. throughout an organization, also in a system using SDDL. Also generally applicable rules can be generated as XACML rules which can then be translated and applied in systems using SDDL. In such a case generation of XACML rules first will reduce the amount of manual work for each new SDDL system that the rules are translated for.

In an embodiment, said logic proposition is translated into an Binary Decision Diagram (BDD) or Reduced-Order Binary Decision Diagram (ROBDD). The translation is carried out using techniques based on the theory of binary decision diagrams (BDDs) and Reduced-Order BDDs (ROBDDs), as outlined in B. Akers, "Binary Decision Diagrams", *IEEE Trans. Comp.*, vol. C-27, no. 6 (1978), p. 509 and R. E. Bryant, "Graph-based algorithms for Boolean function manipulation", *IEEE Trans. Comp.*, vol. C-35, no. 8 (1986), p. 677. A plurality of references in this area describe algorithms for translating a logic expression into a BDD or ROBDD, and there exist further algorithms for deriving exhaustive sets of solutions. These solutions may then be converted back into a form that will allow those access requests in the set (R) for which the policy yields the given decision to be extracted. Implementations of such algorithms as libraries of computer-executable code can be retrieved from commercial or non-commercial sources. For example, the library JavaBDD can be retrieved from http://sourceforge.net, http://sourceforge.net/projects/javabdd, http://javabdd.sourceforge.net/or archived versions of these pages. A further BDD package is BuDDy, downloadable from http://buddy.sourceforge.net.

Of course, other ways of producing the intermediary form, i.e. deriving variable assignments ($RC_j$=[$ARC_{j1}$: $v_1$=$x_{j1}$, $ARC_{j2}$: $v_2$=$x_{j2}$, ...], j=1, 2, ...) satisfying the logic proposition, are possible to use, such as methods using a SAT solver, i.e., a functional entity implemented in hardware and/or software and configured to input a satisfiable logic expression and to output, in response thereto, a solution (or a variable assignment, or a set of values of variables in the expression) for which the logic expression evaluates to true. Many SAT solvers are known in the art and available from commercial or non-commercial providers. The form in which the logical expression is to be input may vary between different SAT solvers, and this is preferably taken into account when the translation into a satisfiable Boolean expression is implemented, so that compatibility can be ensured. In general, an ABAC policy encoded in one of the customary or standardized languages is not compatible. Some SAT solvers are configured to return a single solution even though the logic expression may evaluate true for several variable assignments. It may be desirable to exhaust the set of solutions; this may be achieved invoking the SAT solver repeated times, wherein a condition excluding the previous solution is added to the logical expression before a new repetition is initiated. As SAT solvers are typically highly specialized for the task of finding a variable assignment satisfying the expression, extraction can be completed very efficiently.

The Boolean variables ($v_i$, i=1, 2, ...) each correspond to an original fragment (a piece of a target or a condition) in the XACML policy which has been replaced by the variable in the translation into a logic proposition. When creating the at least one SSDL this may be done based on the original fragment. More specifically, it may be done by adding a translation of the original fragment to said at least one SDDL rule for each variable assignment of said variable assignments ($RC_j$=[$ARC_{j1}$: $v_1$=$x_{j1}$, $ARC_{j2}$: $v_2$=$x_{j2}$, ...], j=1, 2, ...) satisfying the logic proposition.

Each ARC corresponds to a fragment of the XACML policy which must evaluate to true or false as indicated by the ARC. The nature of the solution means that the fragment in the ARC is simple enough that it can be directly translated into SDDL, except for some XACML operators which do not currently have corresponding operators in SDDL, such as time operators. For instance the XACML string-equals function can be simply translated into the SDDL==operator. If the ARC must evaluate to false, the expression must be negated when it is translated. For instance the string-equals function may be translated to the SDDL !=operator. Each ARC is thus translated to a logic expression in the SDDL language.

In the intermediate language RC/ARC structure the ARC represent fragments which must all apply, that is they must be combined with a logical AND operator. This is accomplished with the SDDL && operator.

Thus the set of ARC within a RC are translated into a logical expression in the SDDL language. The SDDL logical expressions from the RC are then put inside one "conditional Access Control Entry (ACE)" in SDDL.

In the intermediate language each RC represent expressions if which at least one may apply, that is they must be combined with a logical OR operator. In SDDL the corresponding "conditional ACEs" are combined into a "policy rule". SDDL treats multiple "conditional ACEs" within a single "policy rule" as being combined with a logical OR, which corresponds to the logical OR of the RC in the intermediate language.

The "policy rule" in SDDL is put inside an SDDL "policy set". SDDL normally supports multiple "policy rules" with a "policy set", and they are combined with a logical AND operator. However the invention does not need this additional level of nesting, so only one "policy rule" is produced. The "policy set" is the unit which can be deployed for enforcement in SDDL enabled applications. This SDDL "policy set" represents the application of the original XACML policy within the constraints governed by set of possible access requests R in the partial evaluation which was performed.

Creating at least one SDDL rule may be performed by adding, to said at least one SDDL rule, the corresponding original fragment for each variable evaluating to true, and adding, to said at least one SDDL rule, the negation of the corresponding original fragment for each variable evaluating to false. This is performed for each variable assignment of said variable assignments ($RC_j=[ARC_{j1}: v_1=x_{j1}, ARC_{j2}: v_2=x_{j2}, \ldots], j=1, 2, \ldots$) satisfying the logic proposition.

At least a subset of the Boolean variables ($v_i$, $i=1, 2, \ldots$) may each correspond to a match expression, such as for example action-id="print", resource-location=user-location, subject-clearance>=document-classification, subject-role=manager, subject-age<=18, etc. Hence, $v_1$ could be a Boolean variable which is true if subject-role=manager and false if not and $v_2$ could be a Boolean variable which is true if subject-age<=18 and false if not etc.

When the XACML policy has been translated into a logic proposition and then further translated into an ROBDD, the variable assignments ($RC_j=[ARC_{j1}: v_1=x_{j1}, ARC_{j2}: v_2=x_{j2}, \ldots], j=1, 2, \ldots$) which satisfy the logic proposition appear and are extracted using the form of the ROBDD. From those variable assignments satisfying the logic proposition, the corresponding match expressions are derived.

For the example of $v_1$ and $v_2$ above and the variable assignment where $v_1$=true and $v_2$=false is extracted, the match expressions subject-role=manager and subject-age<=18 are derived.

Further, for each variable assignment of said variable assignments satisfying the logic proposition, the corresponding match expression is added to the at least one SDDL rule for each variable evaluating to true. Furthermore, the negation of the corresponding match expression is added to the at least one SDDL rule for each variable evaluating to false.

Hence, in the running example, subject-role=manager and subject-age>18 are added to the at least one SDDL rule.

In a particular embodiment only one, i.e. a single, SDDL rule is created from an XACML policy. This is done by creating one line of said one SDDL rule for each variable assignment of said variable assignments ($RC_j=[ARC_{j1}: v_1=x_{j1}, ARC_{j2}: v_2=x_{j2}, \ldots], j=1, 2, \ldots$) satisfying the logic proposition.

In one embodiment, the set (R) of admissible access requests is equal to the set ($R_{tot}$) of all admissible access requests. More specifically, no restrictions are made on the admissible requests and all of the attributes are left undefined.

In an alternative embodiment, the set (R) of admissible access requests is a proper subset of the set ($R_{tot}$) of all admissible access requests, wherein each of the set (R) comprises one or more attributes appearing in the XACML policy (P) and explicit values assigned to these. More specifically, restrictions are introduced on the admissible requests, such as a restriction that the request has to concern a particular type of resource, a particular action, a particular subject etc. In this embodiment the original policy (P) is first simplified using partial evaluation, e.g. by first extracting attributes to which all access requests in the set (R) assign identical values, then reducing the XACML policy (P) at least by substituting values for the extracted attributes, and finally caching the policy after said reducing as a simplified policy (P'). It is then the cached simplified policy (P') and the given decision (d) that are translated into a satisfiable logic proposition in Boolean variables ($v_i$, $i=1, 2, \ldots$).

The method of the invention is valid both for a given decision (d) being a permit access and in alternative a deny access. However, as current versions of SDDL only support access control by means of rules relating to permit access, one embodiment of the invention specifies the given decision (d) to be permit access. An alternative embodiment specifying the given decision (d) to be deny access is of course feasible as well, namely in connection with future versions of SDDL supporting also access control by means of rules relating to deny access.

In a second and third aspect, the invention provides a computer-program product and a policy converter for performing the method outlined above. The computer program product and policy converter generally share the advantages and potential for further developments with the first aspect of the invention.

It is noted that the invention relates to all combinations of features, even if these are recited in mutually different claims.

BRIEF DESCRIPTION OF THE DRAWINGS

Embodiments of the present invention will now be described in more detail with reference to the accompanying drawings, on which.

DETAILED DESCRIPTION OF EMBODIMENTS

Figure 1:
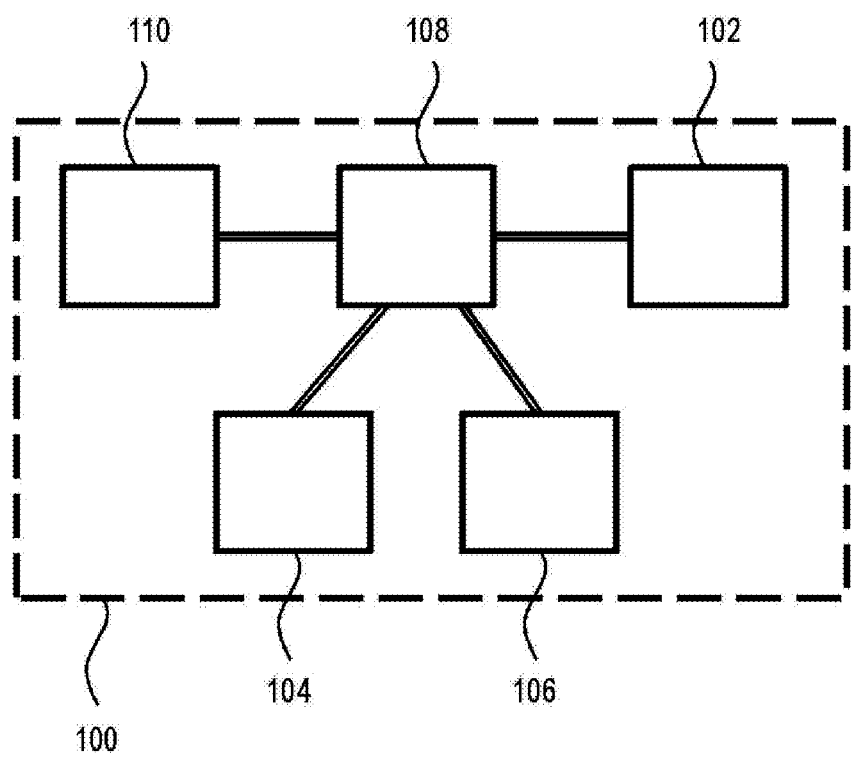
FIG. 1 illustrates an exemplifying AC policy architecture.

FIG. 1 is a generalized block diagram of the XACML architecture 100, although simplified, according to the prior art. As stated before, XACML is an access control policy language. An attempt to access a resource 102 is represented as a "Request", which lists attributes of the subject 104, the resource 102, the action and the environment 106. An attribute is an identifier, a data type and a value. It can also be described as a variable with a name (the identifier), a data type and a value. Most facts relating to the subject 104, the resource 102, the action and the environment 106 can be described in terms of attributes.

The request is constructed by a PEP 108. The purpose of a PEP 108 is to guard access to a resource 102 and only let authorized users through. The PEP 108 itself does not know who is authorized, but it submits the request to a PDP 110, which contain policies governing what requests are to be permitted or denied, respectively. The PDP 110 evaluates the policies and returns a permit/deny response to the PEP 108. The PEP 108 then either lets the access proceed or stops it. As already noted, the PEP (Policy Enforcement Point) may provide only some initial attribute values and the PDP (Policy Decision Point) or other components may dynamically fetch more values from remote sources as they are needed. If all necessary values cannot be retrieved, the policy evaluation may return an output to the effect that the policy is indeterminate or not applicable in the circumstances, or an error message.

A purpose of this architecture is to establish separation of concerns, that is, to differentiate between policy decision making and policy enforcement. Enforcement is by its nature specific to a particular resource 102, while a decision engine can be made general purpose and reusable.

Figure 2:
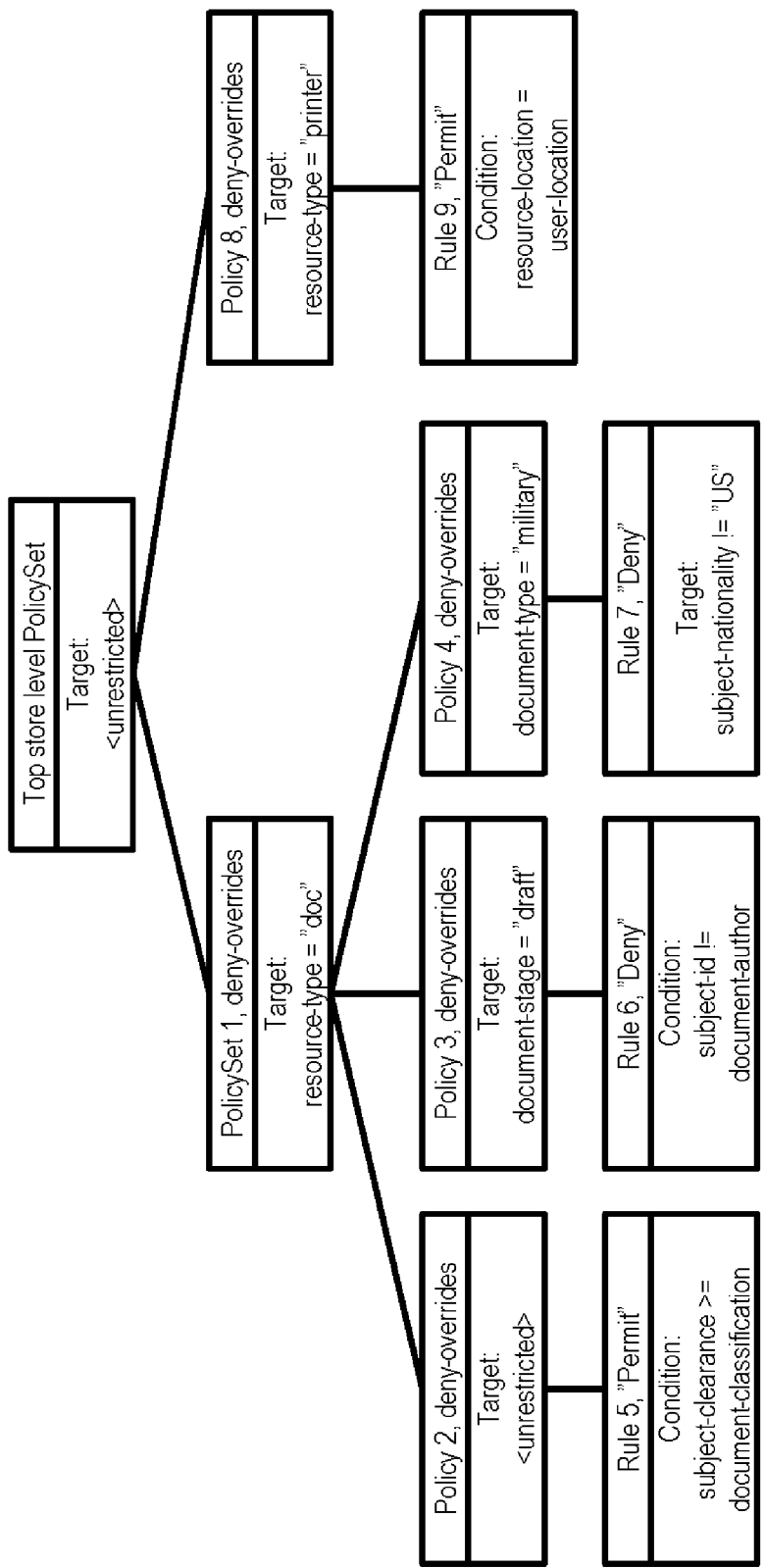
FIG. 2 is a tree representation of an AC policy set.

In general, policies can be nested to form a policy set, which may be visualized in a tree form of the type shown in FIG. 2. The combination of different policies is governed by combining algorithms, which define what policy takes precedence over another policy. The node "PolicySet 1" in FIG. 2 is of the "deny-overrides" type, so that a "Deny" decision from one of the three sub-trees will take precedence. Alternatively, sub-trees may also connect at a "permit-overrides" node. At the lowest level of the tree shown in FIG. 2, there are rules including effects (e.g., "Deny") and underlying conditions formulated in terms of attributes, for instance, "subject-nationality !='US'", where "subject-nationality" is a subject attribute and "US" is a constant.

Figure 3:
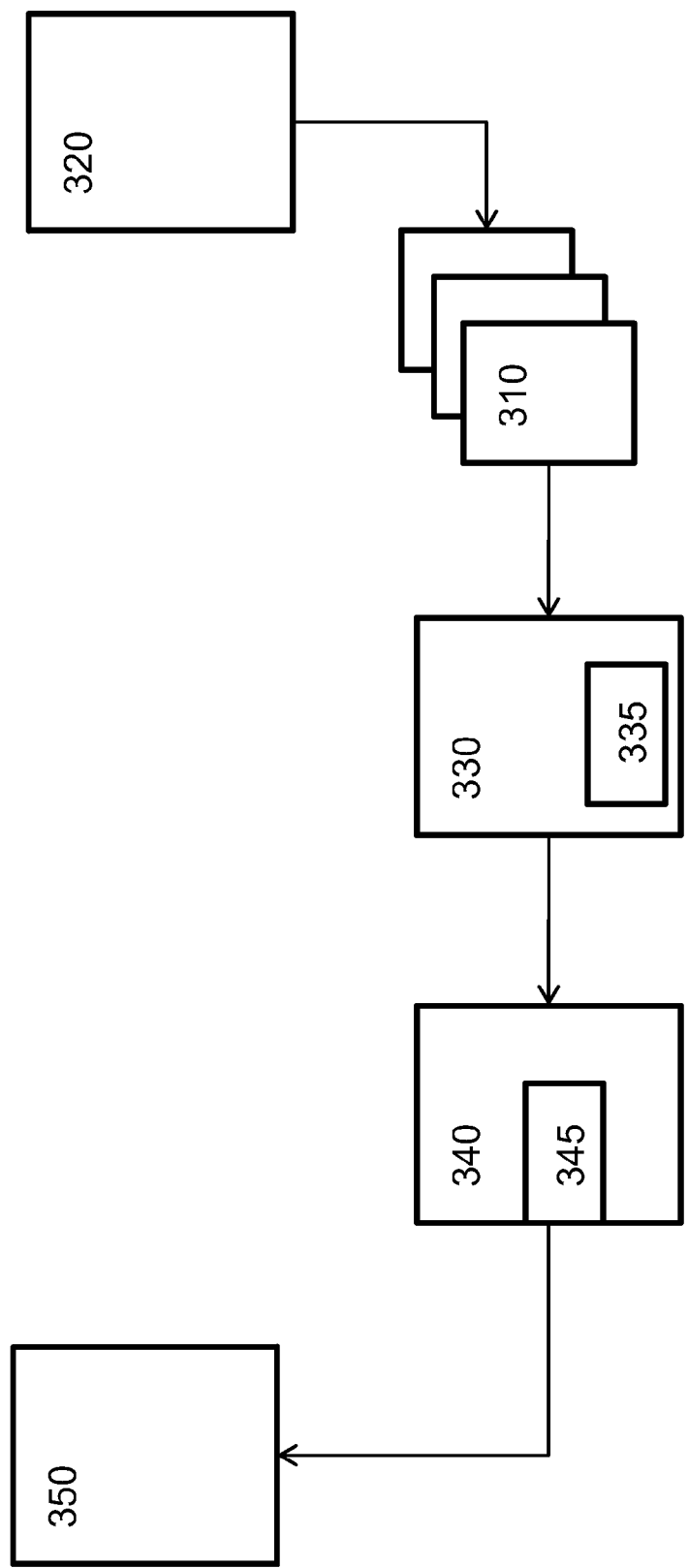
FIG. 3 is a block diagram of a system in which an embodiment of the invention is implemented.

FIG. 3 is a block diagram of a system in which an embodiment of the invention is implemented. The aim of the embodiment is to produce relevant SDDL rules for access control in a Windows Active Directory from a XACML policy. A set of XACML policies 310 has been produced and may be managed through an XACML authority tool 320, such as Axiomatics Policy Server (APS).

An XACML policy of the XACML policies 310 is fed into a Transformation engine 330 including a reverse query block 335 for evaluating reverse queries, such as the Axiomatics Reverse Query (ARQ). In addition to the XACML policy, a reverse query is produced as input to the reverse query block 335. The reverse query indicates a given decision (d), which is one of permit access and deny access, and a set (R) of admissible access requests. The set of admissible access requests may be all possible access requests, i.e. without any restrictions. In the present embodiment, the set of admissible access requests is restricted such that only requests relating to current time are admissible. This is due to the fact that current versions of SDDL do not support time-variable access control.

In alternative, the complete policy may be used for reverse query evaluation and the restriction to SDDL rules relating to current time may be performed in a later stage of the translation.

Furthermore, the given decision (d) can be one of permit access and deny access. In the present embodiment, the given decision (d) is permit access. This is due to the fact that current versions of SDDL do not support access control based on SDDL rules for deny access. An embodiment adapted for the given decision (d) being deny access is apparent from the present description and would be used for a future version of SDDL including rules for denying access.

From the set of admissible (R) requests, the given decision (d) permit and the XACML policy (P), a simplified policy (P') is produced. First, attributes to which all access requests in the set (R) assign identical values are extracted. Then the XACML policy is reduced at least by substituting values for the extracted attributes and the policy after said reducing as a simplified policy (P') is cached.

Extraction of attributes with identical values assigned may be performed by (and corresponding modules in the system may be adapted for) studying each of the attributes appearing in the requests in the set (R) to discover whether equal or different values are assigned to them. Attributes with equal values in all requests are extracted. An attribute to which some requests assign values and some requests do not is preferably not extracted. Step ii may be refined further by forming subsets within the set (R), wherein a first group of attributes has identical values in a first subset, a second group of attributes—possibly overlapping with the first group—has identical values in a second subset, and so forth. The reduction will then lead to a corresponding number of simplified policies, so that the method bifurcates into several branches, the results of which are gathered to form the final result.

Since the simplified policy can be represented as a smaller set of processing instructions (code), it is in general more economical to evaluate. As far as the XACML context is concerned, it is noted that the simplified policy may be represented in the same form as the original policy. However, the simplified policy may in some cases require a richer representation than standard XACML, possibly including a number of new quasi-error states stemming from the fact that some attributes have not yet been evaluated (substituted). For instance, a situation may arise in which a rule cannot be evaluated for lack of target or lack of values assumed by the attributes appearing in a condition in the rule. The simplified policy may then contain an indication that the rule is indeterminate, that is, temporarily overriding the standard evaluation rules, which may specify for this situation that an evaluation error is to be signaled. This is useful since it may turn out, when combining algorithms in the policy are applied, that the sub-tree in which this rule is located is inconsequential to the policy evaluation, so that this sub-tree may be eliminated from the simplified policy. It is noted that if the simplified policy is not represented in standard XACML, evaluation engines adapted for standard XACML may need to be modified to evaluate a simplified policy.

The concept of a simplified policy and the technique of partial evaluation have been described in more detail in the applicant's earlier applications. Using the terminology of these earlier applications, the initial request may be regarded as a partial request, and the step of reducing may be regarded as a partial evaluation of the policy.

Partial evaluation of the XACML policy may for instance proceed as described in full detail in the applicant's application PCT/EP2011/069691, which is hereby incorporated by reference. As such, the partial evaluation for a set of attributes may comprise the substeps of:

with the aid of a partial request generation means constructing a partial request from said set of attributes via a policy information means;

sending said partial request to a partial evaluation means;

with the aid of a first storing means, storing all policies for all sets of attributes;

performing partial evaluation against the policy stored in said first storing means, resulting in a simplified policy; and with the aid of a second storing means, storing said simplified policy.

Alternatively, the partial evaluation may proceed as follows:

inputting a full XACML policy comprising a plurality of attribute-dependent expressions, wherein each expression is evaluable to one of Not applicable, Indeterminate and either Permit or Deny;

inputting a partial request comprising at least one attribute value and at least one attribute identified as variable;

partially evaluating said full XACML policy by substituting said at least one attribute value for a corresponding attribute appearing in the policy, and forming, based on the evaluation result and predetermined simplification rules, a simplified XACML policy equivalent to the full XACML policy, wherein said simplified XACML policy comprises an expression having a result data field for storing said evaluation result.

In this connection, the result data field comprises a condition result field, operable to store at least a Permit or Deny result from the evaluation of the expression itself, and/or a target result field, operable to store at least a Not applicable result from the evaluation of the expression itself. The result data field may comprise an argument data field operable to store a result from the evaluation of an expression which is subordinate to the expression itself.

With continued reference to the partial-evaluation process, the predetermined simplification rules may be one of the following:

i) a rule stipulating that an expression evaluable to only Indeterminate is formed in the simplified XACML policy for each expression in the full XACML policy which evaluates under the partial request to Indeterminate and which is connected by a deny-overrides combining algorithm to at least one expression that is evaluable to Permit and not completely evaluable under the partial request, wherein the value Indeterminate is stored in the result data field;

ii) a rule stipulating that an expression evaluable to only Indeterminate is formed in the simplified XACML policy for each expression in the full XACML policy which evaluates under the partial request to Indeterminate and which is connected by a permit-overrides combining algorithm to at least one expression that is evaluable to Deny and not completely evaluable under the partial request, wherein the value Indeterminate is stored in the result data field;

iii) a rule stipulating that an expression evaluable only to False is formed in the simplified XACML policy for each expression in the full XACML policy which evaluates under the partial request to False and which is connected by a Boolean AND function to at least one expression that is not completely evaluable under the partial request, wherein the value False is stored in the result data field;

iv) a rule stipulating that one expression evaluable only to Indeterminate is formed in the simplified XACML policy if there is at least one expression in the full XACML policy which evaluates under the partial request to Indeterminate and which is connected by a target-type combining algorithm to at least one expression that is not completely evaluable under the partial request, wherein the value Indeterminate is stored in the result data field.

The simplified policy (P') and the given decision (d) permit access are then translated into a satisfiable logic proposition in Boolean variables ($v_i$, i=1, 2, . . . ). In the present embodiment the Boolean variables ($v_i$, i=1, 2, . . . ) each correspond to a fragment (a piece of a target or a condition) of the simplified policy. Hence, $v_1$ could be a Boolean variable which is true if subject-role=manager and false if not and $v_2$ could be a Boolean variable which is true if subject-age<=18 and false if not etc.

The logic proposition is in turn translated into an Reduced-Order Binary Decision Diagram (ROBDD) using techniques based on the theory of binary decision diagrams (BDDs) and Reduced-Order BDDs (ROBDDs).

When the simplified policy (P') has been translated into a logic proposition and then further translated into an ROBDD, the variable assignments ($RC_j$=[$ARC_{j1}$: $v_1$=$x_{j1}$, $ARC_{j2}$: $v_2$=$x_{j2}$, . . . ], j=1, 2, . . . ) which satisfy the logic proposition appear and are extracted using the form of the ROBDD. From those variable assignments satisfying the logic proposition, the corresponding original fragments are derived.

For the example of $v_1$ and $v_2$ above and the variable assignment where $v_i$=true and $v_2$=false is extracted, the original fragment subject-role=manager and subject-age<=18 are derived.

Further, in the embodiment, for each variable assignment of said variable assignments satisfying the logic proposition, a new line in one SDDL rue is created and the corresponding original fragment is added to the line in said one SDDL rule for each variable evaluating to true. Furthermore, the negation of the corresponding original fragment is added to the line in said one SDDL rule for each variable evaluating to false.

Hence, in our running example, subject-role=manager and subject-age>18) are added to a line in said one SDDL rule.

The output from the Transformation engine 330 is a transformation of the simplified policy (P') to the SDDL rule including a line corresponding to each variable assignment which satisfies the logic proposition. The SDDL rule is input to a Rights application component 340 including a plug-in 345 for translating and loading it into an instance of Microsoft Corporation's Active Directory 350 for enforcement by Microsoft Windows Server 8 (not shown).

Further embodiments of the present invention will become apparent to a person skilled in the art after studying the description above. Even though the present description and drawings disclose embodiments and examples, the invention is not restricted to these specific examples. For instance, the invention can be applied to control access to resources (objects) outside the context of computing; as an example, access to the premises in a building can be controlled if suitable identification means (e.g., card readers, biometric sensors, which identify a person as a subject in a guarding system) and actuators (e.g., electrically controllable door locks) are provided and are communicatively connected to a computer system for enforcing the AC policy. Numerous modifications and variations can be made without departing from the scope of the present invention, which is defined by the accompanying claims. Any reference signs appearing in the claims are not to be understood as limiting their scope.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A computer-implemented method for producing at least one Security Descriptor Definition Language (SDDL) rule from an attribute-based access control (ABAC) policy (P), said method comprising:
   providing, on a non-transitory computer readable media, a ABAC policy (P) that, when implemented by a processor, is configured to control access to one or more resources in a computer network;
   feeding the ABAC policy (P) to a transformation engine, the transformation engine including software that, when executed by a processor, creates the at least one SDDL rule;
   producing a reverse query indicating a given decision (d), which is one of permit access and deny access, and a set (R) of admissible access requests;
   translating, by the transformation engine based on the reverse query, the ABAC policy (P) and the given decision (d) into a satisfiable logic proposition in Boolean variables ($v_i$, i=1, 2, . . . );
   deriving, by the transformation engine, variable assignments ($RC_j$=[$ARC_{j1}$: $v_1$=$x_{j1}$, $ARC_{j2}$: $v_2$=$x_{j2}$, . . . ], j=1, 2, . . . ) satisfying the logic proposition;
   creating, by the transformation engine, the at least one SDDL rule based on said variable assignments ($RC_j$=[$ARC_{j1}$: $v_1$=$x_{j1}$, $ARC_{j2}$: $v_2$=$x_{j2}$, . . . ], j=1, 2, . . . ) satisfying the logic proposition, wherein the at least one SDDL rule, when implemented by a processor, is configured to control access to the one or more resources in a computer network;
   loading the at least one SDDL rule onto a non-transitory computer readable media of an SDDL system; and
   controlling access to the one or more resources in the computer network using the at least one SDDL rule.

2. The method of claim 1 further comprising:
   translating said logic proposition into an Binary Decision Diagram, BDD, or an Reduced-Order Binary Decision Diagram, ROBDD,
   wherein the deriving is based on said BDD or on said ROBDD.

3. The method of claim 1, wherein the Boolean variables ($v_i$, i=1, 2, . . . ) each corresponds to an original fragment in the ABAC policy which has been replaced by the Boolean variable in the translation into a logic proposition and wherein creating at least one SSDL rule comprises:
   for each variable assignment of said variable assignments ($RC_j$=[$ARC_{j1}$: $v_1$=$x_{j1}$, $ARC_{j2}$: $v_2$=$x_{j2}$, . . . ], j=1, 2, . . . ) satisfying the logic proposition:
   adding a translation of the original fragment, to said at least one SDDL rule.

4. The method of claim 1, wherein the Boolean variables ($v_i$, i=1, 2, . . . ) each correspond to an original fragment in the ABAC policy which has been replaced by the Boolean variable in the translation into a logic proposition, and wherein creating at least one SDDL rule comprises:
   for each variable assignment of said variable assignments ($RC_j$=[$ARC_{j1}$: $v_1$=$x_{j1}$, $ARC_{j2}$: $v_2$=$x_{j2}$, . . . ], j=1, 2, . . . ) satisfying the logic proposition:
   adding, to said at least one SDDL rule, the corresponding original fragment for each variable evaluating to true; and
   adding, to said at least one SDDL rule, the negation of the corresponding original fragment for each variable evaluating to false.

5. The method of claim 1, wherein one SDDL rule is created by creating one line of said one SDDL rule for each variable assignment of said variable assignments ($RC_j$=[$ARC_{j1}$: $v_1$=$x_{j1}$, $ARC_{j2}$: $v_2$=$x_{j2}$, . . . ], j=1, 2, . . . ) satisfying the logic proposition.

6. The method of claim 1, wherein the set (R) of admissible access requests is equal to the set ($R_{tot}$) of all admissible access requests.

7. The method of claim 1, wherein the set (R) of admissible access requests is a subset of the set ($R_{tot}$) of all admissible access requests, wherein each of the set (R) comprises one or more attributes appearing in the ABAC policy (P) and explicit values assigned to these, wherein the translation comprises:
   extracting attributes to which all access requests in the set (R) assign identical values;
   reducing the ABAC policy (P) at least by substituting values for the extracted attributes;
   caching the policy as a simplified policy (P') after said reducing;
   translating the cached simplified policy (P') and the given decision (d) into a satisfiable logic proposition in Boolean variables ($v_i$, i=1, 2, . . . ).

8. The method of claim 1, wherein the given decision (d) is permit access.

9. The method of claim 1, wherein the given decision (d) is deny access.

10. A system comprising:
    an ABAC authority tool; and
    a hardware policy converter to implement a computer-implemented method for producing at least one Security Descriptor Definition Language (SDDL) rule from an attribute-based access control (ABAC) policy (P), wherein said at least one SDDL rule is enforceable for controlling access to one or more resources in a computer network, said method comprising:
    producing a reverse query indicating a given decision (d), which is one of permit access and deny access, and a set (R) of admissible access requests;
    translating, based on the reverse query, the ABAC policy (P) and the given decision (d) into a satisfiable logic proposition in Boolean variables ($v_i$, i=1, 2, . . . );
    deriving variable assignments ($RC_j$=[$ARC_{j1}$: $v_1$=$x_{j1}$, $ARC_{j2}$: $v_2$=$x_{j2}$, . . . ], j=1, 2, . . . ) satisfying the logic proposition;
    creating at least one SDDL rule based on said variable assignments ($RC_j$=[$ARC_{j1}$: $v_1$=$x_{j1}$, $ARC_{j2}$: $v_2$=$x_{j2}$, . . . ], j=1, 2, . . . ) satisfying the logic proposition;
    loading the at least one SDDL rule onto a non-transitory computer readable media of an SDDL system; and
    controlling access to the one or more resources in the computer network using the at least one SDDL rule.

* * * * *